United States Patent [19]
Geiger

[11] Patent Number: 5,966,781
[45] Date of Patent: Oct. 19, 1999

[54] DUAL SPACING CLAMP TIE

[75] Inventor: Gerard G. Geiger, Jackson, Wis.

[73] Assignee: Tyton Hellermann Corporation, Milwaukee, Wis.

[21] Appl. No.: 08/928,933

[22] Filed: Sep. 12, 1997

[51] Int. Cl.[6] .................................................. B65D 63/00
[52] U.S. Cl. ..................... 24/16 PB; 24/17 AP; 248/74.3
[58] Field of Search .............................. 24/16 PB, 17 AP, 24/30.5 P; 248/74.3

[56] References Cited

U.S. PATENT DOCUMENTS

| | | | |
|---|---|---|---|
| 2,432,492 | 12/1947 | Tinnerman | 248/74.3 |
| 3,588,011 | 6/1971 | Peres | 248/74.3 |
| 3,632,071 | 1/1972 | Cameron | 248/74.3 |
| 3,654,669 | 4/1972 | Fulton | 24/16 PB |
| 4,910,831 | 3/1990 | Bingold | 24/16 PB |
| 5,088,158 | 2/1992 | Burkholder | 24/16 PB |
| 5,159,728 | 11/1992 | Bingold | 24/16 PB |
| 5,304,188 | 4/1994 | Marogil | 24/16 PB |
| 5,746,401 | 5/1998 | Condon | 248/74.3 |

Primary Examiner—Victor N. Sakran
Attorney, Agent, or Firm—Ryan Kromholz & Manion, S.C.

[57] ABSTRACT

A dual spacing clamp tie includes a locking head and two flexible straps extending outwardly in opposite directions from the locking head. The straps are insertable through the locking head to form two, spaced loops that can be used to secure items in spaced, parallel relationship to each other. A pair of releasable pawls in the locking head secure the straps around the items to be secured. An aperture through the locking head is provided for securing the dual spacing clamp tie to a mounting structure such as a threaded stud. Preferably, the aperture is smooth-walled and slightly undersized to hold the clamp tie in place through frictional engagement with the stud. If desired, a nut or other fastener can be applied. Alternatively, an additional pawl mechanism can be provided within the aperture to secure the clamp tie to the mounting stud. Again, if desired, a nut or other fastener can be used to further secure the clamp tie to the mounting stud.

17 Claims, 5 Drawing Sheets

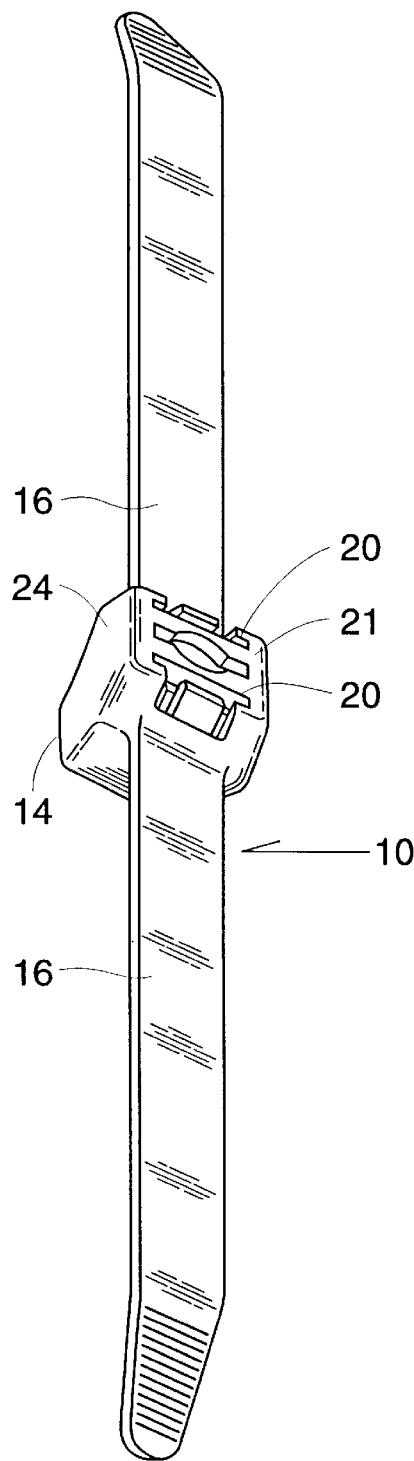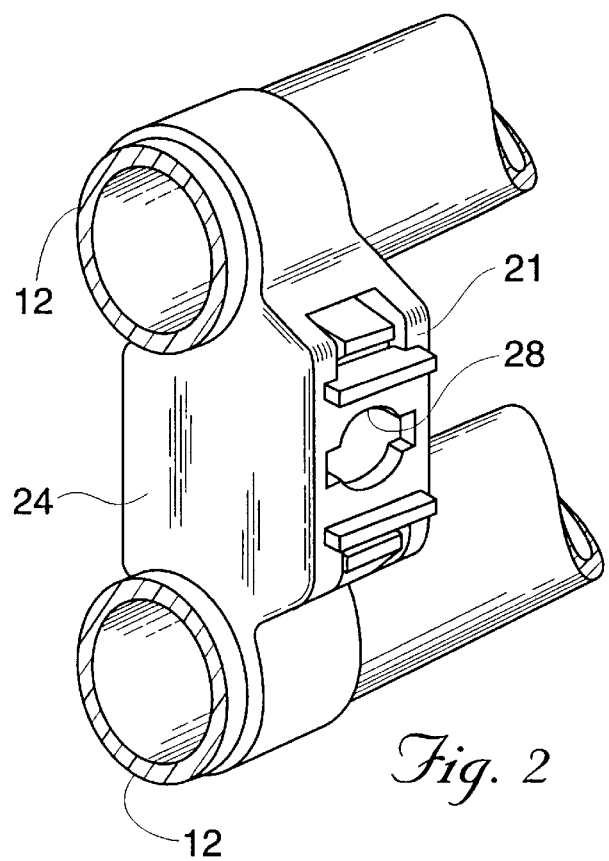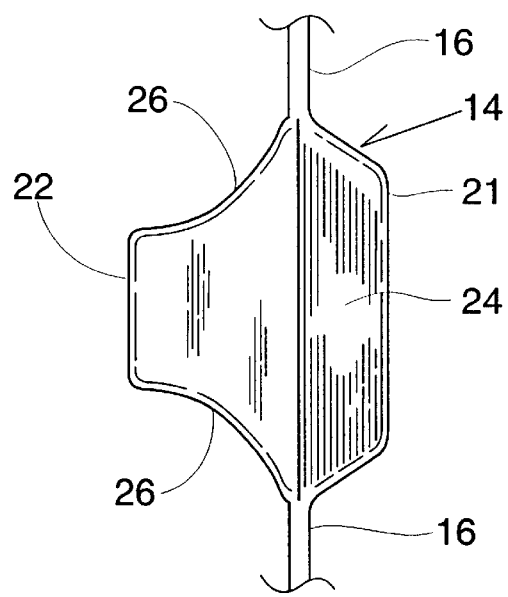

DUAL SPACING CLAMP TIE

BACKGROUND OF THE INVENTION

This invention relates generally to devices for securing elongate items, such as wires, cables, hoses, tubing, conduits etc. More particularly, the invention relates to clamp ties that secure such items in spaced, parallel relationship with each other.

Various devices have been developed for securing elongate items such as wires, cables, hoses, tubing, conduits, etc. Among these devices are clamps that secure a pair of such items in spaced, parallel relationship with each other. Examples of such clamps are shown in U.S. Pat. Nos. 3,654,669 and 3,981,048.

Although effective in securing elongate items to each other, neither of the devices shown in these patents made provision for securing the items not only to themselves but to a supporting structure as well. Such need arises, for example, in the trucking, automotive or other industry wherein a pair of hoses, lines or cables are to be spaced from each other or are to be mounted to a vehicle frame member. Furthermore, prior devices did not include structure for maintaining a definite, preselected spacing between the items that were secured to each other. Such devices were ineffective in maintaining a desired spacing sufficient to avoid chaffing, heat transfer or other adverse consequences of insufficient spacing. The devices simply secured the items together without regard for the resulting spacing.

SUMMARY OF THE INVENTION

The invention provides a dual spacing clamp tie having a locking head, a pair of straps extending in opposite directions from the locking head, a first pawl mechanism within the locking head for engaging and retaining one of the straps, and a second pawl mechanism within the locking head for engaging and retaining the other of the straps.

The invention also provides a dual spacing clamp tie including a locking head having a pair of arcuate surfaces for engaging items to be secured, a pair of straps extending in opposite directions from the locking head and adjacent the arcuate surfaces, a first pawl mechanism within the locking head for engaging and retaining one of the straps, and a second pawl mechanism within the locking head for engaging and retaining the other of the straps.

The invention also provides a dual spacing clamp tie for securing elongate items adjacent a mounting member in spaced substantially parallel relationship to each other. The dual spacing clamp tie includes a locking head having a pair of arcuate surfaces for engaging the items and further having an aperture for receiving therethrough the mounting member. The dual spacing clamp tie further includes a pair of straps extending in opposite directions from the locking head and insertable through the locking head to form a loop in conjunction with each of the arcuate surfaces. A first pawl mechanism is provided within the locking head for engaging and retaining one of the straps in looped relationship with the locking head and one of the arcuate surfaces. A second pawl mechanism is provided within the locking head for engaging and retaining the other of the straps in looped relationship with the locking head and the other of the arcuate surfaces. The aperture is shaped and dimensioned to frictionally engage the mounting member to thereby retain the dual spacing clamp tie adjacent the mounting member until, if desired, a more permanent fastener can be applied.

The invention also provides a dual spacing clamp tie for securing elongate items adjacent a mounting member in spaced substantially parallel relationship to each other. The dual spacing clamp tie includes a locking head having a pair of arcuate surfaces for engaging the items and further having an aperture for receiving therethrough the mounting member. The dual spacing clamp tie further includes a pair of straps extending in opposite directions from the locking head and insertable through the locking head to form a loop in conjunction with each of the arcuate surfaces. A first pawl mechanism is provided within the locking head for engaging and retaining one of the straps in looped relationship with the locking head and one of the arcuate surfaces. A second pawl mechanism is provided within the locking head for engaging and retaining the other of the straps in looped relationship with the locking head and the other of the arcuate surfaces. A third pawl mechanism is provided within the aperture for engaging and retaining the mounting element within the aperture.

In one embodiment, the first and second pawl mechanisms are releasable.

In one embodiment, the aperture is smooth-walled and undersized so that the dual spacing clamp tie is held in position on the mounting element through a friction or interference fit.

In one embodiment, the third pawl mechanism includes triangularly shaped pawls carried at the ends of elongate hinges within the aperture.

In one embodiment, the dual spacing clamp tie comprises a single unitary structure.

In one embodiment, the dual spacing clamp tie is formed of injection molded plastic.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a perspective view of a dual spacing clamp tie embodying various features of the invention.

FIG. 2 is a perspective view of a dual spacing clamp tie installed on a pair of hoses.

FIG. 3 is a partial side view of the locking head portion of the dual spacing clamp tie shown in FIGS. 1 ad 2.

DESCRIPTION OF THE PREFERRED EMBODIMENTS

Figure 4:
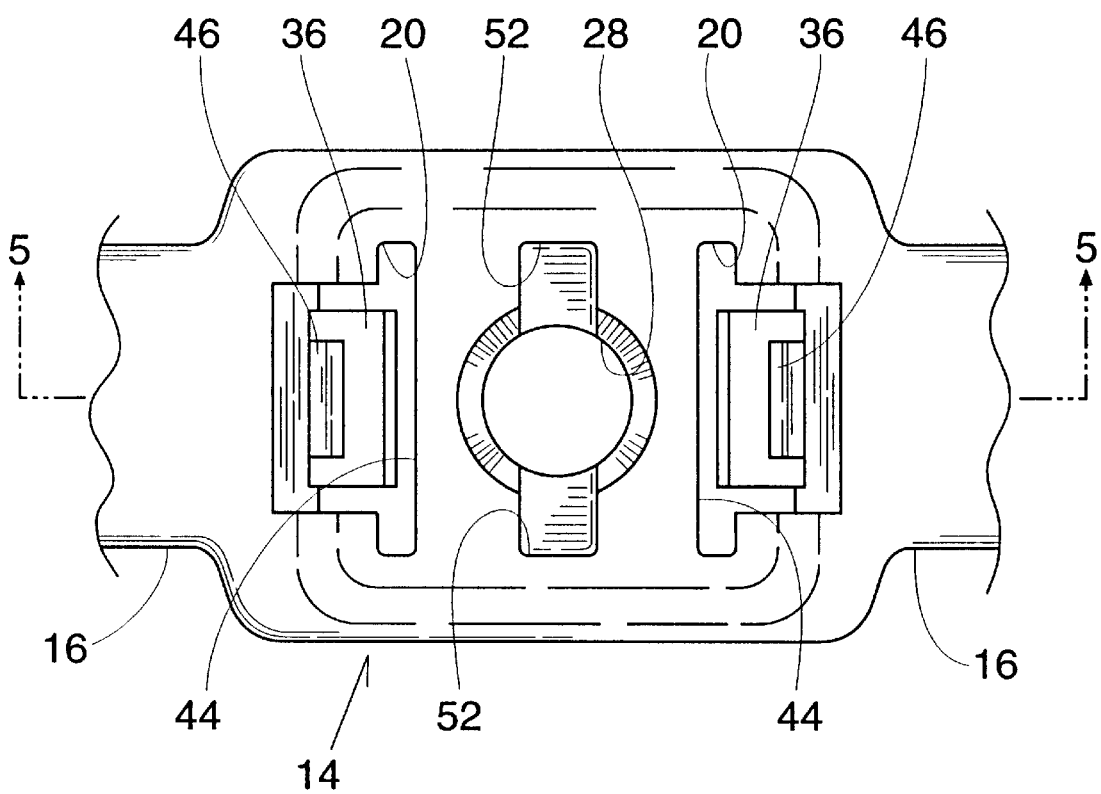
FIG. 4 is a top plan view of the locking head shown in FIG. 3.

A dual spacing clamp tie 10 embodying various features of the invention is shown in FIGS. 1–5. As best seen in FIG. 2, the dual spacing clamp tie 10 functions to hold two elongate items 12 in spaced, substantially parallel relationship with each other. In the example shown, the items 12 are hoses. It will be appreciated, however, that the particular items secured by the dual spacing clamp tie 10 are not critical and can comprise, wires, cables, tubes, conduits, fiber optics, vines or other such items as well as bundles made up of multiple ones of such items.

Prior to use, the dual spacing clamp tie 10 appears as shown in FIG. 1. As illustrated, the dual spacing clamp tie 10 includes a locking head 14 centrally disposed between a pair of elongate straps 16 that extend outwardly in opposite directions from the locking head 14.

The straps 16 are each preferably of substantially uniform width and thickness except at their ends where each tapers into a tie tail portion 18. A pair of spaced, substantially parallel slots 20 are formed through the locking head 14. Each slot 20 is shaped and dimensioned to allow the passage of the adjacent strap 16 therethrough. The items 12 to be secured by the dual spacing clamp tie 10 are secured by looping one of the straps 16 around the item 12 and inserting the strap 16 through an adjacent slot 20 in the locking head 14. The straps 16 are then pulled to tighten them around the items 12. The tapered tie tail 18 of each strap 16 facilitates insertion of the strap through the adjacent slot 20.

Referring further to FIGS. 1–5, the locking head 14 comprises a somewhat bulbous structure having an upper surface 21, a lower surface 22, a pair of substantially parallel, planar side surfaces 24 and a pair of arcuate engaging surfaces 26 positioned and shaped to lie closely adjacent the items 12 when they are secured by the dual spacing clamp tie 10. In the illustrated embodiment, each engaging surface is positioned adjacent and below the juncture of a strap 16 with the locking head and generally conforms to the circular shape of the loop that is formed when the strap 16 is inserted through the slot 20 and pulled tight against the items 12 to be secured. It will be appreciated that the final diameter of the loop formed by each strap 16 depends on the size of the items 12 to be secured. If desired, each engaging surface can be shaped to match the anticipated size of the item 12 to be secured.

Figure 5:
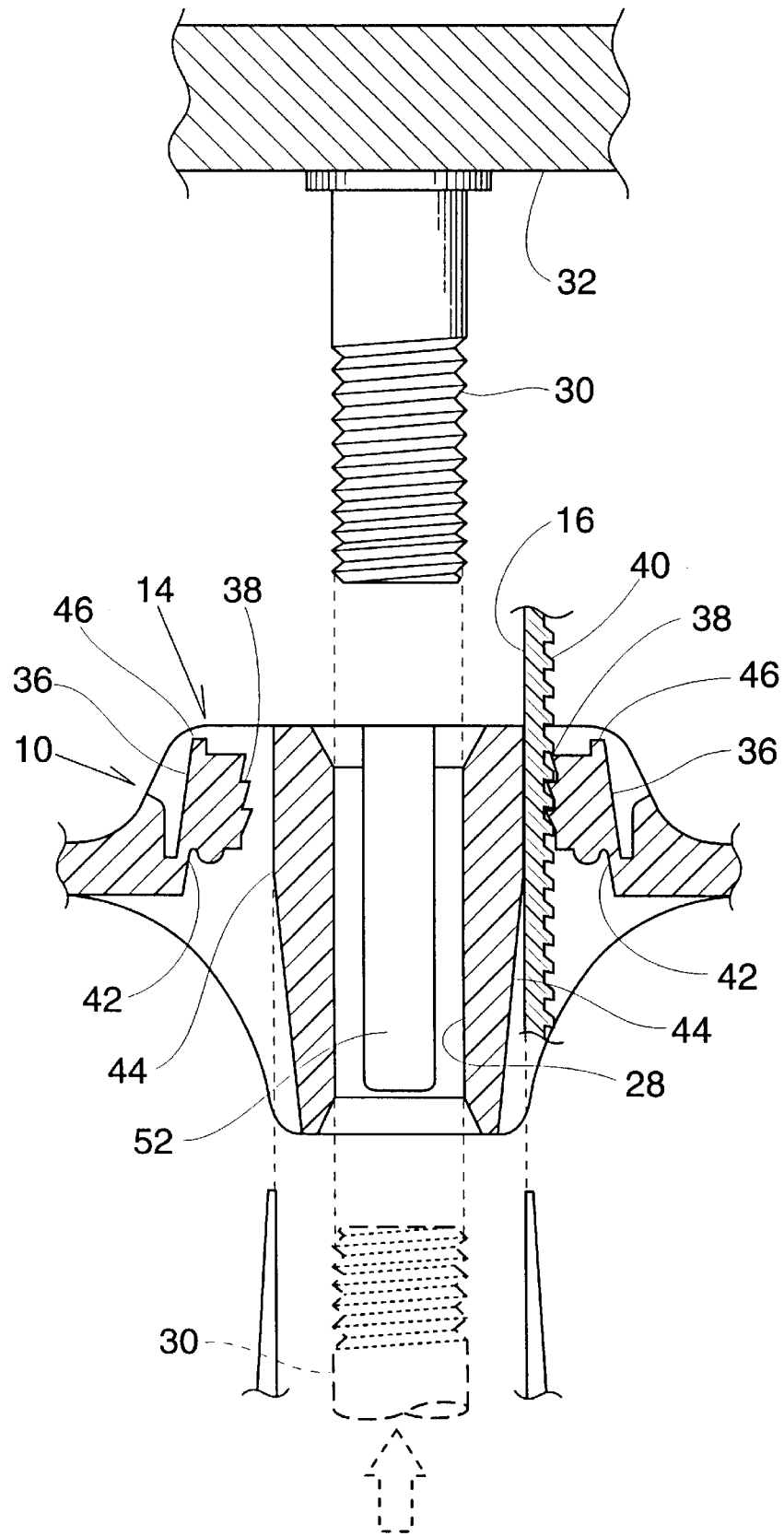
FIG. 5 is a cross-sectional view of the locking head shown in FIG. 4 taken along line 5—5 thereof, further showing the clamp tie mounted onto a supporting surface by means of a mounting stud or other fastener, and further showing a strap portion of the clamp tie locked within the locking head.
Figure 6:
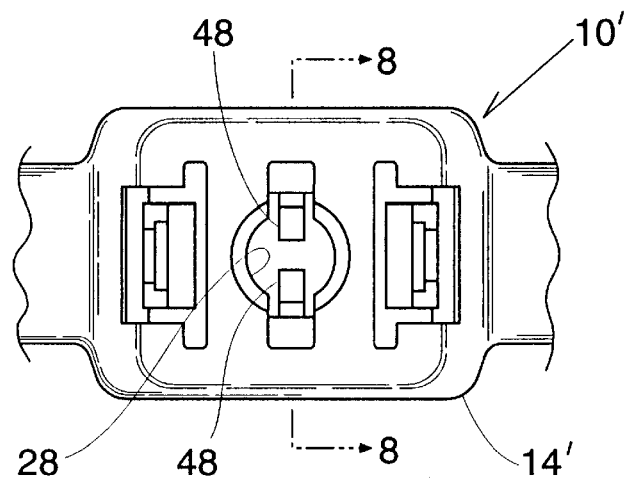
FIG. 6 is a top plan view of an alternate embodiment dual spaying clamp tie.
Figure 7:
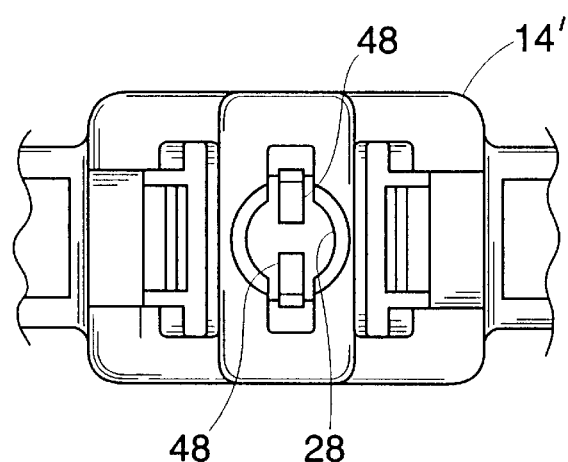
FIG. 7 is a bottom plan view of the alternate embodiment dual spacing clamp tie shown in FIG. 6.

The dual spacing clamp tie 10, in addition to securing items 12 to each other in parallel spaced relation, can also function to secure the items to another structure. To this end, the locking head 14 preferably includes a central aperture 28 extending through the locking head 14 between the slots 20. As best seen in FIG. 5, the central aperture 28 permits a mounting element, such as a threaded mounting stud 30, to extend through the locking head 14. In the illustrated embodiment, the mounting stud is welded to an underlying support or structure 32 such as, for example, a frame rail in a truck or other vehicle. Preferably, the central aperture 28 is undersized relative to the stud 30 so that frictional engagement with the threads of the stud 30 keeps the tie 10 firmly in place around the stud 30 and adjacent the supporting structure 32. As further shown in FIG. 5, the central aperture is preferably flared at each end and is of substantially uniform diameter so that the mounting stud 30 can pass through in either direction. This enables the tie 10 to be installed with either the upper surface 21 or lower surface 22 adjacent the supporting structure.

In accordance with one aspect of the invention, and as best seen in FIGS. 4 and 5, first and second pawl mechanisms are provided for securing the straps 16 within the locking head 14 and around the items 12 to be secured. As illustrated, each of the first and second pawl mechanisms includes a pawl 36 having a generally wedge shaped cross section. A forward surface of each pawl 36 is provided with a plurality of teeth 38 that engage complementary serrations 40 formed on the adjacent side of each strap 16 when the strap 16 is looped around the items to be secured and then inserted through the locking head 14.

As illustrated, each pawl 36 is carried at the end of an integrally formed hinge 42 that enables the pawl 36 to pivot relative to the locking head. Preferably, the pawls 36 are biased toward the strap 16 to pinch the strap 16 between the pawl 36 and the interior side wall 44 of each slot 20 when the strap 16 is inserted through the slot 20. This helps ensure intimate contact between the teeth 38 of the pawl 36 and the serrations 40 of the strap 16. Preferably, the teeth 38 of the pawl 36 and the serrations 40 on the strap 16 are ramped as shown. The ramped surfaces thus formed push the pawl 36 away from the strap 16 as the strap 16 is inserted through the slot 20 to facilitate insertion of the strap 16 through the slot 20. Withdrawing movement of the strap 16 relative to the slot 20, however, pulls the pawl 36 into stronger engagement with the serrations 40 of the strap 16 to resist such withdrawing movement and thereby secure the strap 16 within the slot 20 and around the items 12 to be secured.

Preferably, each of the first and second pawl mechanisms is releasable. To this end, a finger tab 46 is integrally formed on each pawl 36 and is accessible from the top of the locking head 14. By pulling the finger tab 46 away from the strap 16 with a fingernail, screwdriver or other device, the pawl 36 is pulled away from engagement with the strap 16. This releases the strap 16 thereby enabling the strap 16 to be withdrawn from the locking head 14 to free the secured items 12. In this manner, the dual spacing clamp tie 10 can be released and removed from the secured items 12. As best seen in FIGS. 1, 2 and 4, the upper end of each slot 20 widened adjacent the upper end of the locking head to provide sufficient clearance for the finger tab 46 and for releasing movement of the pawl 36.

In the preferred embodiment shown in FIGS. 1–5, the diameter of the aperture 28 is slightly undersized relative to the diameter of the mounting element 30 so that a friction fit or engagement results when the locking head 14 is pressed onto the mounting element 30. As an example, making the diameter of the aperture 28 approximately five percent smaller than the diameter of the mounting element 30 has been found to give satisfactory results. Friction between the interior side walls of the aperture 28 and the mounting element 30 is sufficient to keep the tie 10 in place on the mounting element 30.

Preferably, the ends of the aperture 28 are flared as shown to facilitate insertion of the mounting element 30 through the aperture from either direction. Additionally, two parallel, diametrically opposed slots 52 are formed in the side walls of the aperture 28. These slots reduce the material needed to form each tie 10 help create a substantially uniform wall thickness in the tie 10 that avoids sinks created as the material from which the tie 10 is formed cools following molding.

Figure 8:
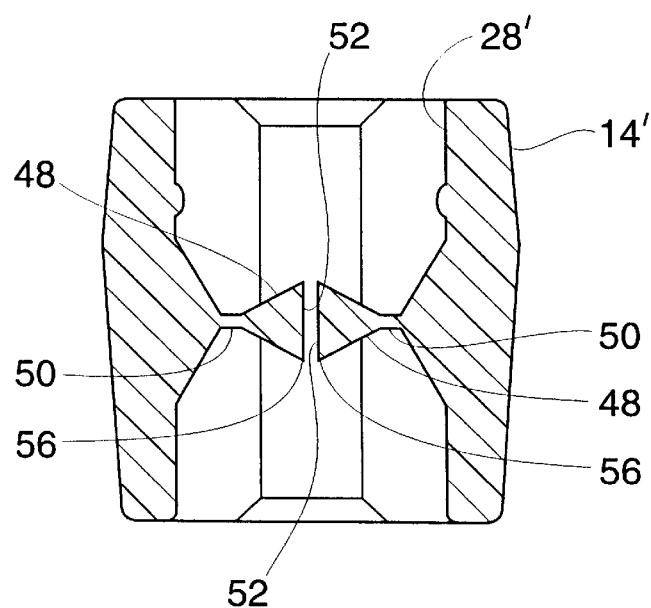
FIG. 8, is a cross-sectional view of the alternate embodiment locking head shown in FIG. 6 taken along line 8—8 thereof.
Figure 9:
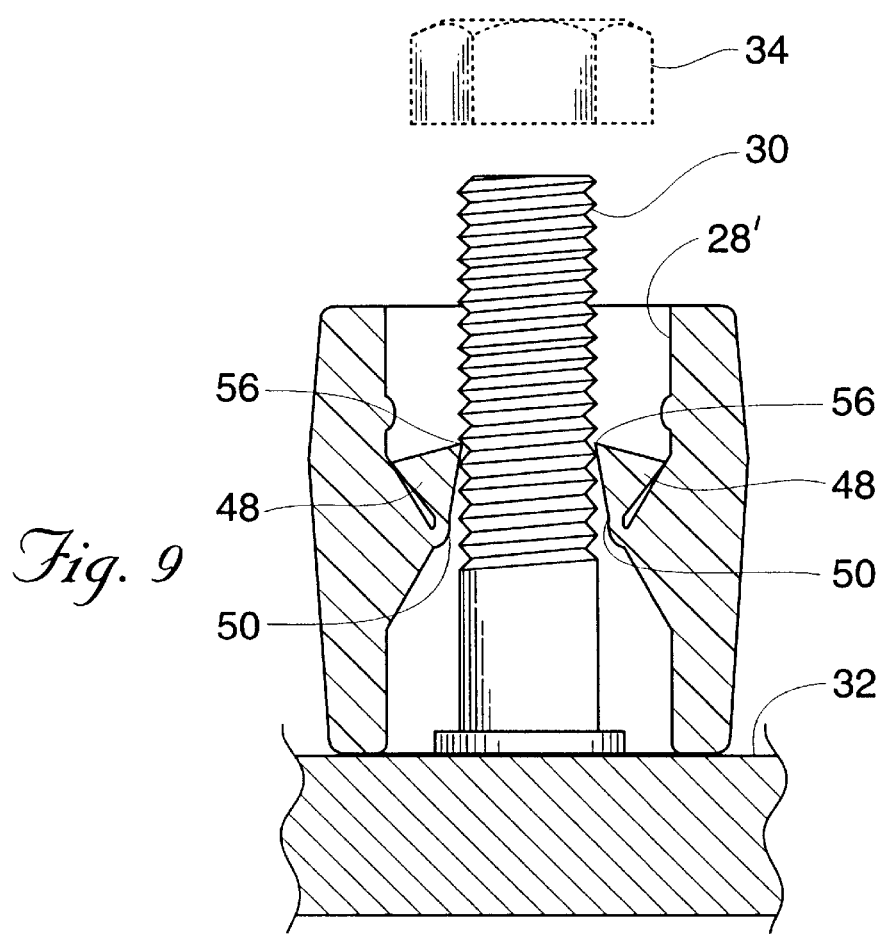
FIG. 9 is a partial sectional view of the alternate embodiment shown in FIG. 8 showing the dual spacing clamp tie mounted onto a supporting surface by means of a mounting stud or other fastener.
Figure 10:
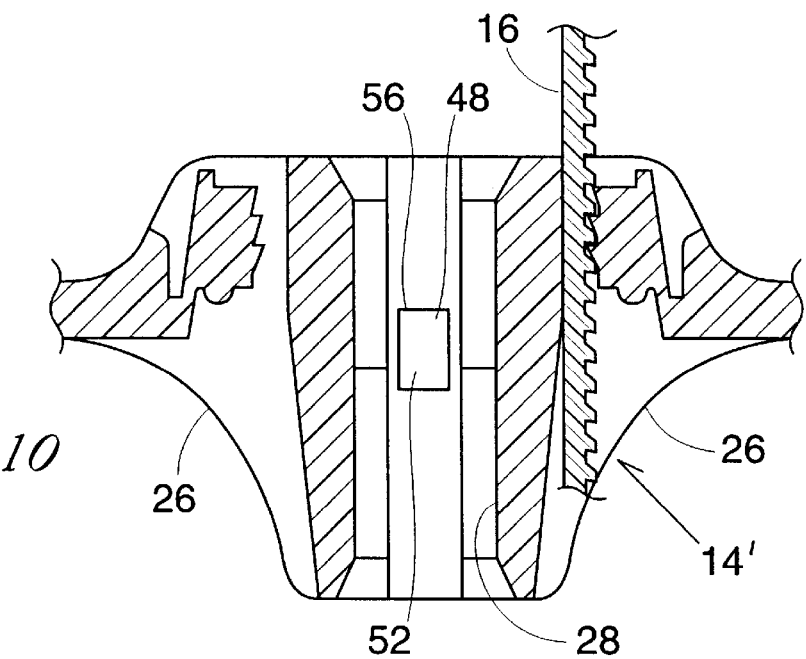
FIG. 10 is a sectional view of the locking portion of the alternate embodiment dual spacing clamp tie of FIGS. 8 and 9 showing a strap portion of the clamp tie locked within the locking head.

An alternate embodiment of dual spacing clamp tie 10' having a self retaining feature is illustrated in FIGS. 6–10. In this embodiment, the central aperture 28' is of sufficient size to easily pass the mounting element 30 (FIG. 9) a third pawl mechanism is provided in the aperture 28' for engaging the mounting element 30 and retaining the dual spacing clamp tie 10' on the mounting element 30. The third pawl mechanism, which is best seen in FIGS. 8 and 9, includes a pair of additional pawls 48 positioned diametrically opposite each other across the aperture 28'. Each pawl 48 comprises a substantially triangularly shaped member carried at the end of an elongate hinge 50. Preferably, the side walls of the aperture 28' slope inwardly toward each other as shown in the vicinity of the pawls 48 so that the pawls 48 lie closely adjacent each other (FIG. 8) when the mounting element 30 is not present in the aperture 28'. Additionally, the pawls 48 are oriented as shown in FIG. 8 with their vertical flat surfaces 52 spaced from and facing each other. When so oriented, the pawls operate to permit passage of the mounting element 30 in either direction through the aperture 28' and thereafter to resist withdrawing movement of the mounting element 30 in the opposite direction through the aperture 28'. This enables the dual spacing clamp tie 10' to be pressed onto the mounting element 30 from either side with relatively little effort while nevertheless retaining the dual spacing clamp tie 10' onto the mounting element 30.

As best seen in FIG. 9, passage of the mounting element 30 through the aperture 28' deflects the pawls 48 as shown. The pawls 48 pivot around their respective hinges so that the outermost points 56 of the pawls engage the mounting element 30. If the mounting element 30 is threaded as shown, the points 56 engage the threads to help secure and retain the dual spacing clamp tie 10 to the mounting element 30. Withdrawing motion of the mounting element 30 thereafter tends to wedge the pawls 48 between the mounting element 30 and the tapered side walls of the aperture 28' to further lock the dual spacing clamp tie 10' to the mounting element 30.

If desired, an additional fastener, such as a nut 34 (FIG. 9) can be used with either tie 10 or 10' to effect a more secure attachment between the tie and the supporting surface 32.

Preferably, the dual spacing clamp ties 10 and 10' each comprise a single, unitary element that is economically injection molded from a suitable thermoplastic material using known fabrication techniques. It will be appreciated that the size and shape of the dual spacing clamp tie 10 can be modified to suit particular items 12 and applications. In particular, it will be appreciated that the distance between the article engaging surfaces 26 can be selected to maintain a desired fixed spacing between the articles 12 that are secured. Additionally, the dimension between the upper and lower surfaces 21 and 22 of the locking head 14 can be selected to provide a desired clearance for the secured articles 12 relative to the supporting surface 32. Accordingly, it will be appreciated that the particular design features of the embodiment shown and described are meant to be illustrative rather than limiting.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. A dual spacing clamp tie comprising:
 a unitary member including;
  a single locking head including a pair of laterally spaced apertures,
  a pair of straps extending in opposite directions from the locking head,
  a first pawl mechanism contained within one of said locking head apertures for engaging and retaining one of the straps,
  a second pawl mechanism contained within the other of said locking head apertures for engaging and retaining the other of the straps, and
  said locking head including a third aperture located intermediate said pair of laterally spaced apertures and for receiving a mounting element therethrough.

2. A dual spacing clamp tie as defined in claim 1 further comprising structure within said third aperture for engaging the mounting member to secure the locking head to the mounting element.

3. A dual spacing tie clamp as defined in claim 1 wherein the third aperture frictionally engages the mounting element to secure the dual spacing clamp tie to the mounting element.

4. A dual spacing tie clamp as defined in claim 3 wherein the third aperture is undersized relative to the mounting element.

5. A dual spacing tie clamp as defined in claim 4 wherein the third aperture comprises a smooth-walled opening of substantially circular cross-section.

6. A dual spacing clamp tie comprising:
 a locking head,
 a pair of straps extending in opposite directions from the locking head,
 a first pawl mechanism within the locking head for engaging and retaining one of the straps,
 a second pawl mechanism within the locking head for engaging and retaining the other of the straps,
 said locking head further including an aperture for receiving a mounting element therethrough,
 structure within the aperture for engaging the mounting member to secure the locking head to the mounting element, and
 said structure comprising an additional pawl mechanism operable to permit movement of the mounting element in one direction through the aperture and to resist movement of the mounting element in the opposite direction through the aperture.

7. A dual spacing clamp tie as defined in claim 6 wherein the additional pawl mechanism includes a pair of opposed pawls located substantially opposite one another within the aperture.

8. A dual spacing clamp tie as defined in claim 7 wherein each of the opposed pawls comprises a substantially triangularly shaped member carried at the end of a hinge extending from a wall of the aperture.

9. A dual spacing clamp tie comprising:
 a locking head having a pair of arcuate surfaces for engaging items to be secured,
 a pair of straps extending in opposite directions from the locking head and adjacent the arcuate surfaces,
 a first pawl mechanism within the locking head for engaging and retaining one of the straps, and
 a second pawl mechanism within the locking head for engaging and retaining the other of the straps,
 said locking head further including an aperture for receiving a mounting element therethrough,
 structure within the aperture for engaging the mounting member to secure the locking head to the mounting element, and said structure comprising an additional pawl mechanism operable to permit movement of the mounting element in one direction through the aperture and to resist movement of the mounting element in the opposite direction through the aperture.

10. A dual spacing clamp tie as defined in claim 9 wherein the additional pawl mechanism includes a pair of opposed pawls located substantially opposite one another within the aperture.

11. A dual spacing clamp tie as defined in claim 10 wherein each of said opposed pawls comprises a substantially triangularly shaped member carried at the end of a hinge extending from a wall of the aperture.

12. A dual spacing clamp tie comprising:
- a locking head having a pair of arcuate surfaces for engaging items to be secured,
- a pair of straps extending in opposite directions from the locking head and adjacent to arcuate surfaces,
- a first pawl mechanism within the locking head for engaging and retaining one of the straps,
- a second pawl mechanism within the locking head for engaging and retaining the other of the straps,
- said locking head further including an aperture for receiving a mounting element therethrough, said aperture including structure for frictionally engaging the mounting member to secure the locking head to the mounting element, said aperture being undersized relative to the mounting element and comprising a smooth-walled opening of substantially circular cross-section, and being flared at each of its ends, and
- wherein the aperture includes a plurality of channels for achieving a substantially uniform wall thickness in the locking head of the dual spacing clamp tie.

13. A dual spacing clamp tie for securing elongate items adjacent a mounting member in spaced substantially parallel relationship to each other, comprising:
- a locking head having a pair of arcuate surfaces for engaging the items and further having an aperture for receiving therethrough the mounting member,
- a pair of straps extending in opposite directions from the locking head and insertable through the locking head to form a loop in conjunction with each of the arcuate surfaces,
- a first pawl mechanism within the locking head for engaging and retaining one of the straps in looped relationship with the locking head and one of the arcuate surfaces,
- a second pawl mechanism within the locking head for engaging and retaining the other of the straps in looped relationship with the locking head and the other of the arcuate surfaces, and
- a third pawl mechanism within the aperture for engaging and retaining the mounting element within the aperture.

14. A dual spacing clamp tie as defined in claim 13 wherein the first and second pawl mechanisms are releasable.

15. A dual spacing clamp tie as defined in claim 14 wherein the third pawl mechanism permits movement of the mounting element through the aperture in a first direction but resists movement of the mounting element through the aperture in the opposite direction.

16. A dual spacing clamp tie as defined in claim 15 wherein the third pawl mechanism includes a pair of opposed, triangularly shaped pawls carried at the ends of two elongate hinges disposed substantially diametrically opposite each other within the aperture.

17. A dual spacing clamp tie as defined in claim 16 wherein the dual spacing clamp tie comprises a single unitary structure.

* * * * *